United States Patent [19]

Weinberger et al.

[11] 3,758,124
[45] Sept. 11, 1973

[54] NICKEL-ALUMINUM-TITANIUM OXIDE FLAME-SPRAY COATING FOR BEARING AND PISTON RING MEMBER WEAR SURFACES

[75] Inventors: Carl S. Weinberger, Timonium; William T. Hale, Freeland, both of Md.

[73] Assignee: Koppers Company, Inc.

[22] Filed: May 17, 1971

[21] Appl. No.: 144,193

Related U.S. Application Data

[63] Continuation-in-part of Ser. No. 800,671, Feb. 9, 1969, abandoned.

[52] U.S. Cl. ............... 277/224, 29/191, 29/195 M, 117/93.1 PF, 117/105.2, 117/131, 117/160, 252/12, 252/466 J
[51] Int. Cl. ............................ F16j 9/22, B05b 5/20
[58] Field of Search ................. 106/1, 286; 117/22, 117/105.2, 93.1 PF, 131, 160, 46 FS; 252/12, 466 J; 277/223, 224; 29/191, 195 M

[56] References Cited
UNITED STATES PATENTS

| | | | |
|---|---|---|---|
| 3,322,515 | 5/1967 | Dittrich et al. | 106/1 |
| 3,060,500 | 10/1962 | Spellman | 117/105.2 |
| 3,110,571 | 11/1963 | Alexander | 117/22 |
| 2,869,227 | 1/1959 | Bradstreet | 117/105.2 |
| 2,964,420 | 12/1960 | Poorman et al. | 117/22 |
| 2,161,597 | 6/1939 | Swartz | 117/22 |
| 2,187,348 | 1/1940 | Hodson | 117/22 |
| 3,077,659 | 2/1963 | Holzwarth et al. | 117/105.2 |
| 3,539,192 | 11/1970 | Prasse | 117/93.1 PF |
| 3,560,006 | 2/1971 | Watanabe | 117/105.2 |

*Primary Examiner*—William D. Martin
*Assistant Examiner*—Michael Sofocleous
*Attorney*—Fred C. Trenor et al.

[57] ABSTRACT

A bearing member, e.g., a piston ring, for use in an internal combustion engine at temperatures up to 1,200° F having a wear-resistant coating from 0.010 to 0.020 inches finished thickness flame-sprayed on a wear surface thereof, such coating, before spraying, preferably consisting of an admixture of 34.4 parts by weight of elemental nickel particles jacketed with 8.6 parts by weight of elemental aluminum with the balance being 57 parts by weight of titanium dioxide, such particles sized to pass through a 120 mesh screen but not through a 325 mesh screen.

9 Claims, 4 Drawing Figures

INVENTORS
CARL S. WEINBERGER &
WILLIAM T. HALE 3,758,124

NICKEL-ALUMINUM-TITANIUM OXIDE FLAME-SPRAY COATING FOR BEARING AND PISTON RING MEMBER WEAR SURFACES

CROSS REFERENCE TO RELATED APPLICATIONS

This application is a continuation-in-part of application Ser. No. 800,671 filed on Feb. 9, 1969, now abandoned.

BACKGROUND OF THE INVENTION

This invention relates to piston rings and more particularly to coatings applied to piston rings for use in high performance engines.

Metallurgical wear is the gradual change in the dimensions of a metal part in service under frictional pressure and, thus, it is a primary consideration in high performance engines. Wear of metal surfaces may occur from a variety of causes. Because a machined surface almost never has an absolutely true geometric shape and has a surface roughness due to microscopic protrusions of the metal extending from the surface, wear will always occur when two metal surfaces engage and slide over each other under a load. At the engaging interfaces of the two metal surfaces, the microscopic protrusions will deform and eventually fracture from the surfaces to become abrasive particles which will further abrade the surfaces. Similarly, liquids and gas streams flowing over the surface of a metal at a high velocity will deform and remove the microscopic protrusions. As is well known the conditions of wear are accelerated by high operating temperatures which reduce the strength of the metal surface.

The conditions of wear may be minimized by use of lubricants. When a lubricant is employed between the wearing surfaces of engaging metal parts the film thickness of the lubricant if it exceeds the heights of the microscopic protrusions will significantly reduce the conditions of wear so long as the abrasive particles do not bridge the film thickness of the lubricant between the wearing surfaces.

During the reciprocation of a piston in an internal combustion engine the piston rings carried by the piston engage the cylinder walls of the engine and are slideable thereon whereby wear occurs on both the cylinder walls and the piston rings. Because the purpose of the piston rings is to maintain a seal between the piston and the cylinder wall during the operation of the engine the conditions of accelerating wear must be minimized. A failure of the piston rings to properly seal the piston and the cylinder wall results in gas leakage between the rings and cylinder wall thereby causing low engine compression, bad ignition, incomplete combustion and generally accelerated erosion of the piston rings and of the cylinder wall.

DESCRIPTION OF THE PRIOR ART

Heretofore, the wearing surfaces of piston rings have been coated with a variety of abrasion-resistant materials to reduce their wear; such coatings are generally classed by those skilled in the art into two major categories: (1) corrosion-resistant break-in coatings which improve the shelf-life and run-in capabilities of the coated ring itself and (2) wear-resistant coatings which increase the operating life of the piston ring. This invention relates to the coatings of the latter, wear-resistant category. Not only must the piston ring wearing surfaces be wear-resistant but they must also be non-abrasive to the cylinder wall. If the coated piston ring, itself, is not wear-resistant or if it is too abrasive to the cylinder wall then the displacement between the ring and the cylinder wall will change rapidly and the piston ring will not provide an adequate seal between the piston and the cylinder wall.

Mixtures of elemental molybdenum, elemental chromium and elemental nickel have been flamed sprayed onto piston rings as described in U.S. Pat. No. 3,556,747. The coating described in that patent are serviceable up to temperatures of about 700°F. Today, piston rings are being subjected to even higher temperatures, for example, in excess of 1,200°F. and, hence, there is a need for flame sprayable coatings for piston rings which can sustain these higher temperatures.

U.S. Pat. No. 3,322,515 describes at Example 3 a flame sprayable composition which provides a coating having "excellent thermal shock-resistance, hardness, abrasion-resistance," comprising a powdery admixture of elemental nickel, and elemental aluminum along with the oxide of aluminum. This combination of constituents is not preferred for use with piston rings because aluminum oxides while being wear-resistant at high temperatures are too abrasive against the cylinder wall. Consequently, the flame sprayable composition of U.S. Pat. No. 3,322,515 would not be satisfactory for use as a coating for piston rings.

U.S. Pat. No. 3,322,515 describes a large variety of other flame sprayable compositions as coatings in metal-melting crucibles or molten metal-handling equipment, and as coatings for cathodic protection of iron and steel subject to water and salt-water corrosion and as coatings for providing excellent bearing surface; however, the patent does not consider the particular and peculiar problems associated with coatings for piston rings as outlined above.

Flame sprayed coatings containing only elemental nickel or elemental aluminum are not used with piston rings because they have poor wear-resistant properties. Flame sprayed coatings containing only titanium oxides are not used with piston rings because they do not have sufficient thermal conductivity properties to conduct heat away from the wear surface of the piston ring, although such coatings have good wear-resistant properties. As is well-known titanium oxides are frequently used as a heat insulator. Consequently, the combination of elemental nickel, elemental aluminum and titanium oxides would expectedly produce a coating having poor wear-resistance due to the nickel and aluminum and poor thermal conductivity due to the titanium oxides and, thus, the piston ring coated with such compositions would expectedly have a relatively short life.

Quite surprisingly, we have found a novel flame sprayable material for piston rings which may be used in applications where the coating itself is subjected to temperatures up to 1,200°F, yet which provides a hard, wear-resistant surface that is relatively non-abrasive to the engaging cylinder wall. This novel composition is comprised of elemental nickel, elemental aluminum and of oxides of titanium.

SUMMARY OF THE INVENTION

In accordance with the invention a piston ring for use in internal combustion engines with temperatures up to 1,200°F comprises a ring body having a wear surface and a wear-resistant coating that is adherent to the surface being characterized by flame spraying thereon a physical admixture of the particles. The admixture of particles consist essentially of particles of elemental nickel, elemental aluminum and oxides of titanium having a size such as to pass through a 120 mesh screen but be retained on a 325 mesh screen.

DETAILED DESCRIPTION

Figure 1:
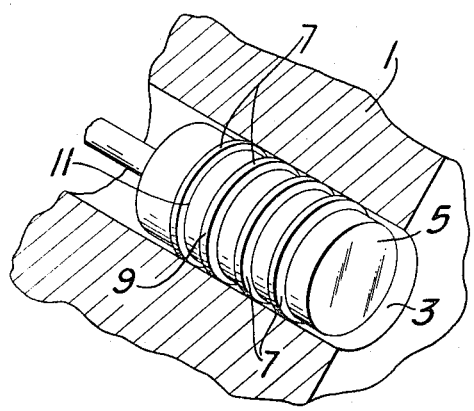
FIG. 1 is a sectional view of a cylinder with a piston carrying piston rings.

In FIG. 1, an engine cylinder 1 having a cylinder wall 3 houses a piston 5 carrying a plurality of piston rings 7 spaced apart from one another, circling the piston 5, and engaging the cylinder wall 3 to form a tight seal between the cylinder wall 3 and the piston 5.

Figure 2:
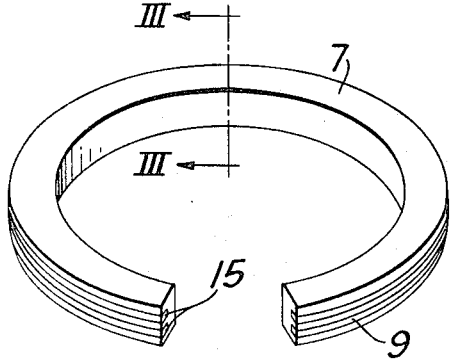
FIG. 2 is a perspective view of a piston ring such as the rings in FIG. 1.
Figure 3:
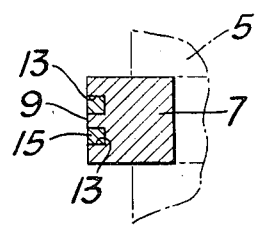
FIG. 3 is a cross-sectional view of a typical pistion ring taken at lines III of FIG. 2.

The piston ring in FIG. 2 is annular having a rectangular cross-section where the outer surface of the ring is a wearing surface 9 for engagement with the cylinder wall 3. As is well known to those skilled in the art, the piston ring 7 must possess a tension sufficient to provide a spring pressure against the cylinder wall 3, when the piston 5 is disposed within the cylinder 1 to maintain the seal therebetween. Conventionally, the piston ring 5 is composed of cast iron. The ring illustrated herein has two grooves 13 machined in the wearing surface 9 into which the novel coating composition 15 is deposited and bonded thereto by applying the composition to the wear surface 9 of the piston ring by flame spraying with a plasma flame gun.

The art of flame spraying is well known. A plasma flamed of a plasma art gun produces temperatures of approximatley 32,000°F. This temperature is achieved by applying electrical energy to a gas mixture (such as a 5-1 nitrogen hydrogen mixture) which gas disassociates the gas molecules to an atom stage which then ionize to produce free electrons and charged ions. The electrical energy absorbed by ionization is converted to heat energy by the de-ionization of the gas. The particulate composition is then directed into the plasma flame by a carrier gas such as nitrogen. The particles are propelled by the gas escaping through the nozzle of the gun as a stream of molten particles. The nozzle is aimed at the surface to be coated so that the molten particles impinge thereon. A mechanical and atomic bond is produced at the interface between the workpiece and the coating particles to form an adherent coating.

In accordance with the invention, we have found a novel flame sprayable composition which is a physical admixture comprised of discrete particles of three components: titanium oxides, nickel, and aluminum. The particles must pass through a number 120 mesh screen, but be retained on a number 325 mesh screen. The particle size range is readily determined by screening particles in accordance with ASTM Test B-214. With particles finer than the 325 mesh screen, vaporization of these fine particles readily occurs and consequently, results in a poor deposit of the particles of the composition on the wear surface 9. With particles coarser than 120 mesh screen, the coarse particles do not melt properly, thereby causing the coating to possess unfused particles that extend from the wear surface. Between the aforementioned particle size range of our invention, the composition, when flame sprayed to a metal substrate, results in a strongly adherent coating.

Generally, titanium oxides exist in several forms including titanium monoxide (TiO), titanium sesquioxide ($Ti_2O_3$), and titanium dioxide ($TiO_2$) or rutile as it is more commonly known. All these forms of titanium oxides are suitable for the invention. Titanium dioxide and monoxide are commercially available for use with our invention and are, therefore, more preferable.

The titanium oxide components must have a purity of 99.5 percent; however, small amounts of silica, zirconium oxide and iron oxide are tolerable. Titanium dioxide is the preferable form of titanium oxide to be practiced in accordance with the invention. As is well known in the art, titanium dioxide has a low thermal conductivity causing it to have poor heat transfer characteristics. In fact, titanium dioxide is frequently used as an insulator in some applications. Yet, titanium dioxide is an extremely hard, wear-resistant material that reduces the build-up of heat due to friction. Titanium dioxide is used in our invention and has the above characteristics commercially available under the trademark METCO 102.

The other two components of nickel and aluminum are conveniently blended together and then mixed with the titanium dioxide. One mixture of nickel and aluminum is commercially available as a clad composite powder comprising aluminum particles surrounded by a jacket of nickel in the ratio of generally four parts by weight of nickel and one part by weight of aluminum. A detailed description of this product occurs in U.S. Pat. No. 3,322,515, F. J. Dittrich et al. A suitable product is sold under the trademark of METCO 404. However, the nickel and aluminum may be a mechanical mixture of discrete particles of nickel and aluminum of the same weight ratio of four parts by weight of nickel and one part by weight of aluminum. A suitable product of this nature is commercially available under the trademark METCO 450. The advantage, of course, in the use of the particles of aluminum clad with nickel is that no separation of nickel and aluminum can occur. The nickel and aluminum composite powder, on the other hand, presents the possibility of segregation of the various elements thereby resulting in a non-homogeneous blend.

It has been found that the nickel and aluminum when flame sprayed onto a metal substrate undergo an exothermic reaction to produce a dense, pore free intermetallic coating which is firmly bonded to the metal substrate. It is postulated that with the composition of our invention, the particles of titanium dioxide enter into this reaction to produce a wear-resistant coating that is resistant to oxidation and has excellent thermal shock resistant properties due to the bonding strength and thermal conductivity of the resulting coating.

Figure 4:
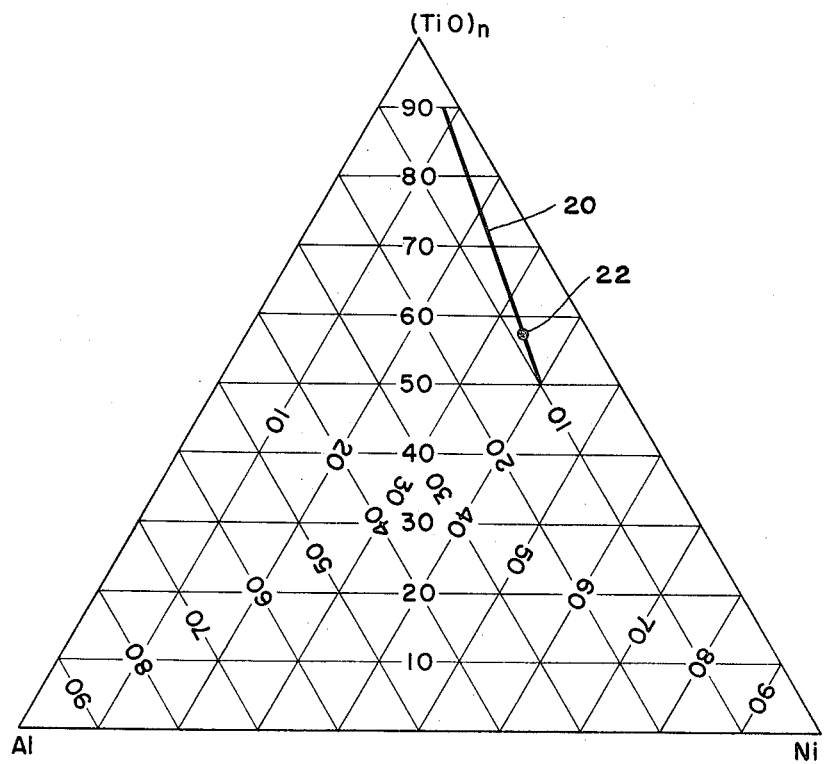
FIG. 4 is a triangular graph illustrating the composition of the invention.

The composition of the invention is illustrated by the black line 20 shown in FIG. 4 while the composition may vary as illustrated by that line, the preferred composition is illustrated at the encircled point 22. The compositions beyond the black line either possess poor bonding strengths or poor wear-resistance.

A mathematical analysis of the composition illustrated by the line of FIG. 4 shows the ingredients to follow the mathematical expression:

$$A (T:O)_n + 0.8(100-A) (Ni) + 0.2(100-A) (Al) = 100$$

where A may range from 50 to 90 parts by weight and where $n$ denotes that several different oxides of titanium may be employed with the invention. The preferred composition of the invention comprises 57 parts of titanium dioxide, 34.4 parts of nickel and 8.6 parts of aluminum in parts by weight.

Before coating the metallic wear surface of the ring with the composition of this invention, the surface of the ring is preconditioned as is known in the art to enable the composition to adequately bond. Typical preconditioning includes degreasing the metal surface, grit blasting to roughen the surface, and applying a primer coating of nickel aluminide, such as METCO 404, ranging from 0.0002 inches to 0.001 inch in thickness.

The coating as applied to the wear surface usually ranges in thickness from 0.015 inches to 0.020 inches in thickness. After the piston ring is coated at its wear surface, it is generally ground for concentricity to a minimum thickness of 0.010 inches. The resultant coating is hard and tenacious to the wear surface of the piston ring. The interface between the wear surface 9 and the cylinder wall 3 may be subsequently subjected to temperatures of 1,200°F without deleterious effects on the coating. The average hardness of the coating ranges between 78 to 80 Rockwell 15 N scale.

A composition in accordance with the invention was prepared by physically mixing together 57 parts by weight of titanium dioxide and 34.4 parts by weight of nickel and 8.6 parts by weight of aluminum. For convenience, the source of the nickel and aluminum was METCO 404, a clad powder having four parts of nickel and one part of aluminum by weight. The composition had a particle size ranging from 44 to 104 microns. A flame spray gun, conveniently a Metco Type 2MB plasma flame gun, was used to flame spray the composition onto a wear surface of a piston ring having a 5.375 inch outside diameter and having a wear surface of one-eighth inch in height. The gun was held in a stationary position perpendicular to the wear surface of the ring which was fixed on a rotating mandrel revolving at 80 rpm. The wear surface was flame sprayed to a coating thickness of 0.015 inches and subsequently machined to a coating thickness of 0.010 inches. The ring was placed in an air-cooled diesel engine operable at 300 BMEP (brake mean effective pressure) using standard lubricants. The test ran continuously for 62 hours. The ring was subsequently removed and visually observed through binocular microscope where the wear surface of the ring appeared to be highly glazed indicating the compatibility of the wear surface of the piston ring with the cylinder and, in addition, indicating good wear. Furthermore, little or no scoring of the cylinder walls or the piston ring was observed. Subsequently, the rings were sectioned. Photomicrographs taken of these sections showed acceptable porosity, thickness and density of the composition.

Although the drawings illustrate the piston ring 7 as including grooves 13 in which the coating 15 is deposited, it should be understood that the coating works equally well when applied to a ring having an uninterrupted wear surface.

Although the invention has been described for use as a coating for piston rings, it is not intended to be limited to such applications but may be used in other applications requiring a high temperature-stable coating that is itself wear-resistant but not too abrasive to an engaging part. For example, exhaust valves, bearing rods and the like may be coated with the aforedescribed composition.

What is claimed is:

1. A bearing member comprising:
    a. a body having a wearing surface for engaging another member; and,
    b. a wear-resistant coating adherent to said wearing surface that is relatively non-abrasive to said engaging member being characterized by flame spraying thereon a physical admixture of particles; said admixture having a size such as to pass through a 120 mesh screen but be retained on a 325 mesh screen; said admixture of particles consisting essentially of particles of:
        i. nickel,
        ii. aluminum,
        iii. oxides of titanium;
    said admixture of particles having a composition defined by the line 20 of FIG. 4.

2. The bearing member of claim 1 wherein the oxides of titanium are comprised of titanium dioxide.

3. The bearing member of claim 1 wherein the aluminum particles are surrounded by a jacket of nickel forming a clad composite particle.

4. The bearing member of claim 1 wherein said coating has a thickness of about 0.010 inch to 0.020 inch.

5. A piston ring for use in internal combustion engines comprising:
    a. a ring body having a wearing surface for engaging a cylinder wall of said engine; and,
    b. a wear-resisting coating adherent to said wearing surface that is relatively non-abrasive to said cylinder wall being characterized by flame-spraying thereon a physical admixture of particles; said physical admixture of particles having a size such as to pass through a 120 mesh screen but be retained on a 325 mesh screen; said physical admixture of particles consisting essentially of particles of:
        i. nickel,
        ii. aluminum
        iii. oxides of titanium;
    said admixture of particles having a composition defined by the line 20 of FIG. 4.

6. The piston ring of claim 5 wherein the oxides of titanium are comprised of titanium dioxide.

7. The piston ring of claim 5 wherein the aluminum particles are surrounded by a jacket of nickel forming a clad composite particle.

8. The piston ring of claim 5 wherein said coating has a thickness of about 0.010 inch to 0.020 inch.

9. A piston ring for use in internal combustion engines comprising:
    a. a ring body made of iron or steel having a wearing surface; and
    b. a wear-resistant, non-abrasive coating adherent to said wearing surface being characterized by flame-spraying thereon a physical admixture of particles; said physical admixture of particles having a size such as to pass through a 120 mesh screen but be retained on a 325 mesh screen; said physical admixture of particles consisting essentially of 57 parts by weight of titanium dioxide, 34.4 parts by weight of nickel and 8.6 parts by weight of aluminum.

* * * * *